April 25, 1939. W. D. THOMPSON ET AL Re. 21,062

CAR ROOF

Original Filed July 8, 1935 2 Sheets-Sheet 1

INVENTORS
WILLIAM D. THOMPSON
DAVID W. HAWKSWORTH
BY: Whittemore, Hulbert & Whittemore & Belknap
ATTORNEYS CAR ROOF
Original Filed July 8, 1935 2 Sheets-Sheet 2
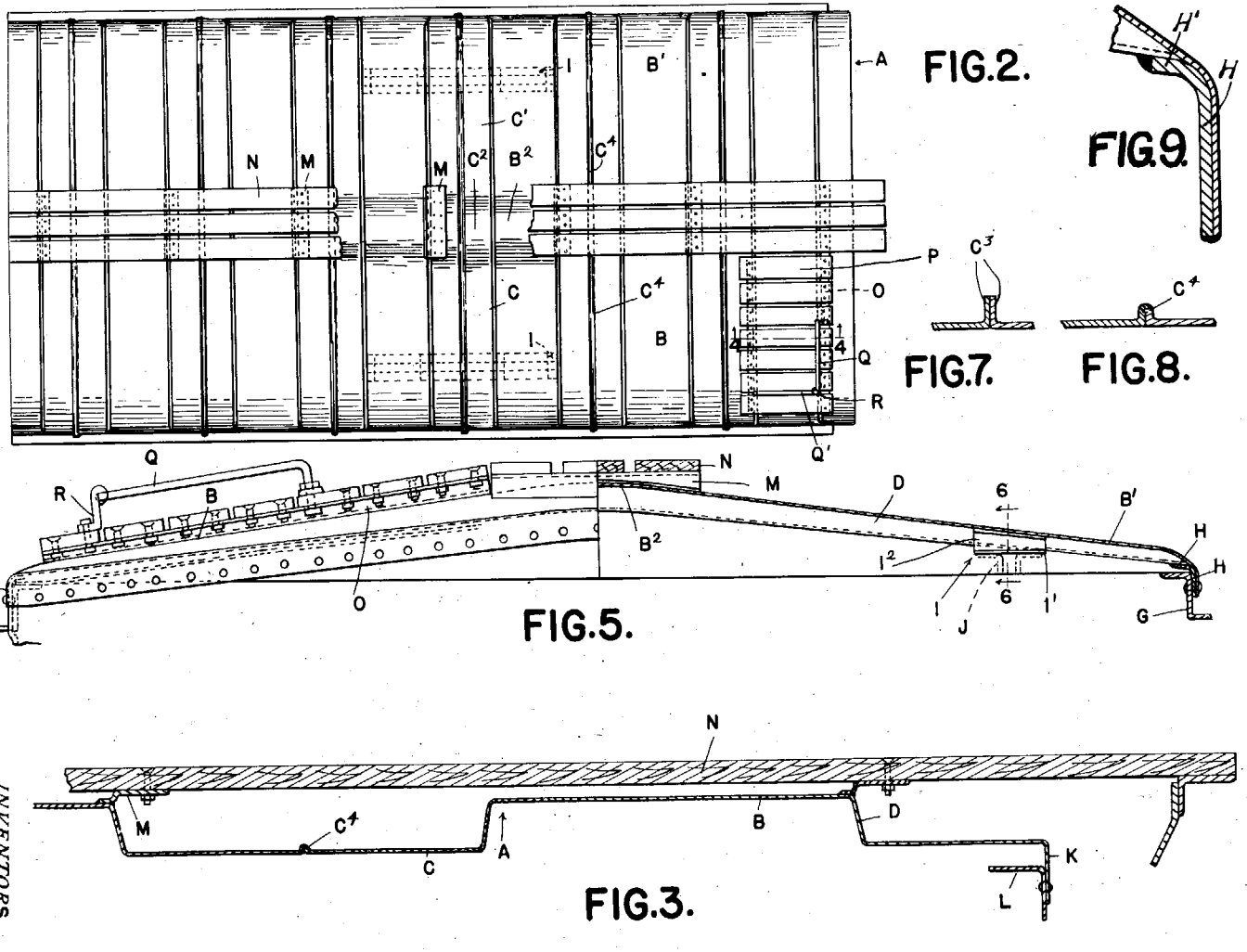
INVENTORS
WILLIAM D. THOMPSON
DAVID W. HAWKSWORTH
BY Whittemore, Hulbert & Whittemore
ATTORNEYS Reissued Apr. 25, 1939 Re. 21,062

UNITED STATES PATENT OFFICE 21,062

CAR ROOF

William D. Thompson and David W. Hawksworth, Birmingham, Mich., assignors, by mesne assignments, to Standard Railway Equipment Manufacturing Company, a corporation of Delaware Original No. 2,136,657, dated November 15, 1938, Serial No. 30,381, July 8, 1935. Application for reissue March 6, 1939, Serial No. 260,179

6 Claims. (Cl. 108—5.4)

The invention relates to car roofs and has for its object the obtaining of a construction formed from a series of light pressed sheet metal units rigidly secured to each other and the side plates of the car. It is a further object to obtain a unit having sufficient inherent strength and rigidity to carry the roof load without the reinforcement of other elements such as carlines and purlines. Still another object is to obtain a very compact construction and one so fashioned as to obtain maximum capacity within the car and adequate external clearance. With these objects in view the invention consists in the construction as hereinafter set forth.

In the drawings:

Fig. 2 is a plan view;

Fig. 3 is a longitudinal section in the plane of the ridge;

Fig. 5 is a cross section, one-half being shown in end elevation;

Figs. 7 and 8 are cross sections illustrating the manner of forming the welded joint between adjacent sheets;

Fig. 9 is an enlarged section of a portion of Fig. 5 showing the welded joint.

Figure 1:
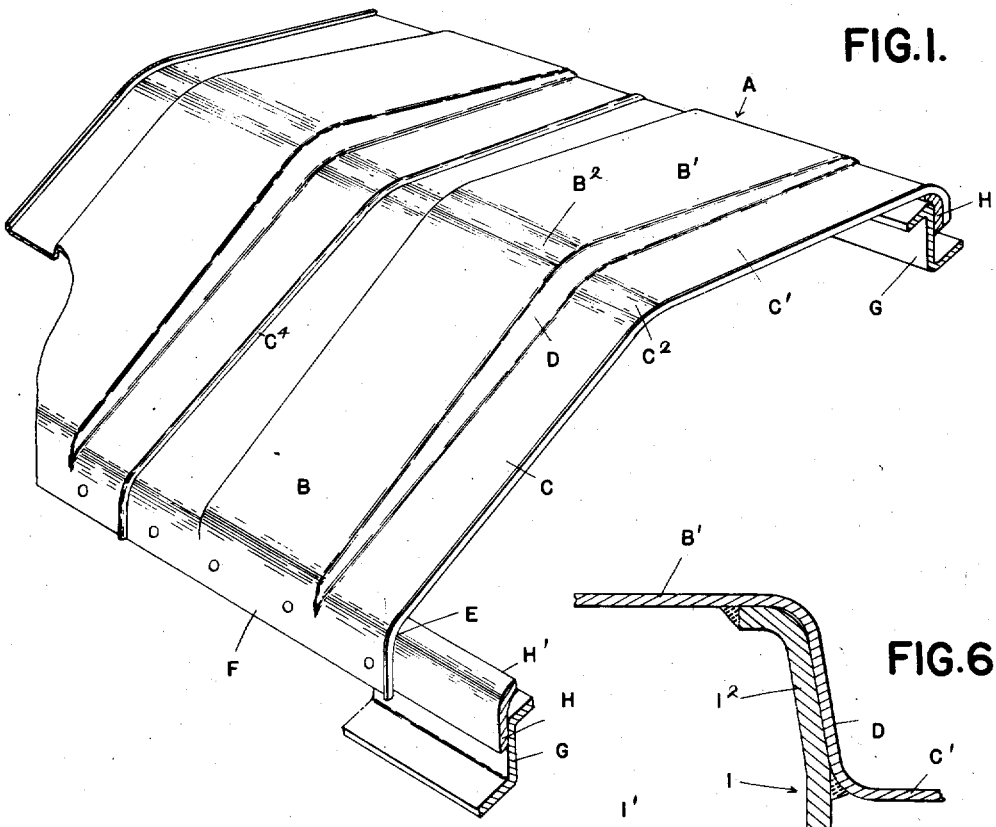
Fig. 1 is a perspective view of a portion of a roof of our improved construction showing the same as mounted upon the side plates of the car frame.
Figure 6:
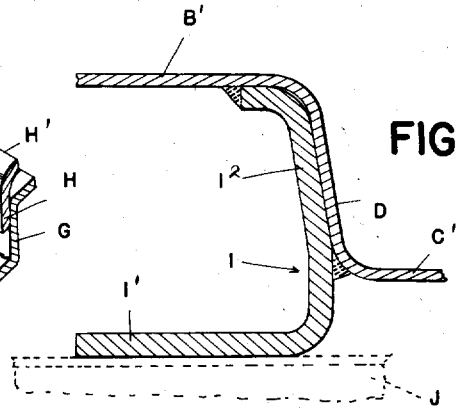
Fig. 6 is a vertical section on line 6—6, Fig. 5.
Figure 4:
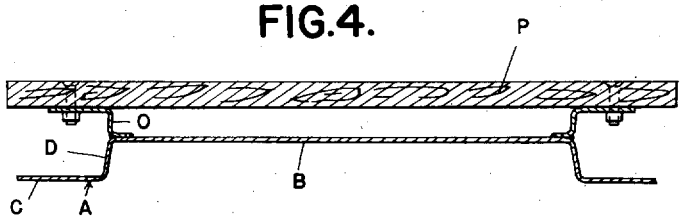
Fig. 4 is a similar section on line 4—4, Fig. 2.

Heretofore car roofs have been formed of sheet metal units which extend from eaves to eaves, and which when united to each other form what is termed a two-plane construction, a portion of the metal being in a lower plane and another portion in an upper plane, with the two portions connected by integral substantially vertically extending portions. Our improved roof is of this type of structure but differs from previous constructions in a number of particulars which result in advantageous characteristics. One feature of the construction is that the units are so designed as to distribute load stresses with substantial uniformity, avoiding the over-stressing of any portion and also avoiding the use of unnecessary metal. This is accomplished by arranging the upper and lower plane portions non-parallel to each other, with the greatest space therebetween at the ridge and tapering toward the eaves on opposite sides of the ridge. Another feature is that the two planes at the eaves merge into a single plane which is downturned and lies adjacent to the side plate of the car frame, to which it may be secured by riveting, welding or in any other suitable way. Another feature is the reinforcement at the eaves by bars which extend continuously for a plurality of units or for the entire length of the car, said bars having a portion lying inside the downturned portion of the units and also an inwardly curved upper portion which fits in the curved bend of the unit and reinforces the same. With such construction the car roof may be formed in several separate sections, each comprising a series of the units welded to each other and to these longitudinal strips which latter provide sufficient rigidity for handling during shipment. Various other advantageous features of the construction will be hereinafter specifically referred to.

Each unit A is formed from a sheet metal blank which is pressed to have upper plane portions B and B′ on opposite sides of the ridge connected to each other at the ridge by a tangent curve portion $B^2$; also lower plane portions C, C′, connected by a similar tangent curve $C^2$ and substantially vertical connected portions D intermediate the two planes. As before stated, the planes B, C and B′, C′, are not parallel but are spaced the greatest distance apart at the ridge and from this point converge toward the eaves. At the eaves the portions in the two planes are connected by rounded portions E with a portion F in a single plane extending vertically downward. The dimensions of the portions in the upper and lower planes are such that there is a single portion in one plane which is substantially the width of two portions on opposite sides thereof in the other plane. As specifically shown, the wide portion is in the upper plane and the narrow portion in the lower plane, said narrow portions being secured to each other by welding. This welding is preferably accomplished by providing each of the adjacent sheets with turned flanges $C^3$ abutting each other and extending a short distance from the common plane of the sheets. These flanges are then welded to each other and fused to form a bead $C^4$ without imparting a great deal of heat to the portions of the sheets in the common plane. This is advantageous, as it prevents warping or distortion of said sheets and also forms an effective union therebetween. As specifically shown, the width of both upper and lower plane portions when secured to each other is the same and preferably 18¾ inches in the neutral axis of the roof, while the spacing of the planes is 2½ inches at the ridge to $1\frac{3}{32}$ at the eaves adjacent to the curved portion. These specific dimensions are of course not essential but are given merely to indicate one successful embodiment of the invention.

The roof is attached to the car frame by riveting or welding to the side plates thereof. Where these side plates are formed of Z-bars G as in the specific construction shown, it is desirable to reinforce the curved portion of the unit between the single plane downturned portion and the transversely extending top portion. For this purpose we preferably use a bar H which has a portion lying adjacent to the inner side of the portion F and also has an upper portion H′ which is curved to fit in the portion E. This bar as previously described may extend either the entire length of the car or for one section of a car roof composed of a plurality of units, and thus in addition to its reinforced function in the completed roof, it imparts rigidity to the roof section during transportation.

Cars which are designed for the shipment of certain specific articles such as automobiles, are frequently provided with equipment for assisting in loading and for holding the load properly positioned during shipment. This equipment is usually attached to the roof frame and subjects the same to additional stresses. To provide for the attachment of such apparatus without local injury to the roof, we have devised the following construction. In the desired locations there is attached to the underside of the roof angle bars I having a lower flange extending in a horizontal plane and an upwardly extending flange $I^2$ which is fashioned to fit against one of the portions D extending around the upper bend beneath the upper plane portion and longitudinally conforming to the pitch of the roof. A number of these members I are attached to adjacent panels so that all of the horizontal flanges I′ extend in a single plane. These provide a suitable anchorage and support for the loading apparatus indicated in dotted lines at J and which extend to engage a plurality of the members I.

The units at the ends of the car are the same as those over the body of the car with the exception that they are provided with an additional downturned flange K which overlaps the end plate L of the car frame. Due to the fact that the portions on opposite sides of the ridge are in downwardly angling planes, the center portion of this flange K will be subjected to an upsetting action during formation. However, by reason of the fact that there is no sharp angle between the portions on opposite sides of the ridge but instead there is a tangent curve portion, the upsetting stresses are so distributed as to not deform the flange K at any one point.

The car roof is provided with the usual longitudinal running boards at the ridge and transverse running boards at the opposite ends. The longitudinal running boards are secured to supporting brackets M which as shown are of Z-bar cross section, the lower flange conforming to the curvature of the upper plane at the ridge and the upper flange being horizontal and extending over the lower plane portion to provide clearance for bolting the running boards N thereto. This construction elevates the running boards but slightly above the upper plane of the roof which gives additional clearance at such point.

The transverse running boards are usually mounted upon a frame which is attached to the side of the car and extend over the roof toward the ridge. In our improved roof these transverse running boards are mounted upon bars O shown as of a Z-cross section, the lower flanges being welded to the upper plane portion of one of the roof panels and the upper flanges extending outward and secured to the running boards P. By reason of the fact that the panels are of considerable width the bars O may be mounted on a single panel as shown and at the same time afford proper support for the transverse running boards. Hand rails Q and Q′ may be formed from a rod bent to have a portion running parallel to one of the bars O and a portion extending across to the parallel bar. These two portions are secured by suitable brackets such as R.

What we claim as our invention is:

1. In a car roof, a series of like symmetrical pressed sheet metal units each comprising portions extending from eaves to eaves in non-parallel spaced planes converging from the ridge toward the eaves and at the eaves merging into downturned portions in a single plane, the upper plane portion being substantially twice the width of lower plane portions on opposite sides thereof and being connected thereto by substantially vertical portions, the narrow portions of adjacent sheets being welded to each other to form in the completed structure alternate upper and lower plane panels constituting chord members of a series of trusses symmetrical throughout the length of the car and a reinforcing strip extending longitudinally through the series of units arranged adjacent to and on the inner side of said downturned portions, being welded thereto to hold the series in rigid relation, said downturned portions being rigidly secured to the side plates of the car frame with said strips lying between each downturned portion and side plate.

2. In a car roof, a series of like pressed sheet metal units, each comprising vertically spaced non-parallel portions extending transversely from eaves to eaves and converging from ridge toward eaves, said portions at the eaves rounding into a downturned portion in a single plane, said units having their adjacent portions in the same plane welded to each other, and reinforcing strips extending longitudinally throughout the series arranged adjacent to the inner sides of said downturned portions and rounded to fit within the curve between said portions and the transversely extending portions, said strips being welded to said downturned portions to form of said series an independently transportable assembly.

3. A car roof comprising a series of pressed sheet metal units, each comprising upper and lower plane portions extending from eaves to eaves and connected by substantially vertical portions, said upper and lower plane portions at the eaves merging into downturned portions in a single plane, the adjacent edges of said units being lap-welded to each other and reinforcing strips extending longitudinally throughout a series of units, being arranged adjacent to the inner face of said downturned portions and welded thereto to form of said series an independently transportable assembly.

4. In a car roof, comprising alternate upper and lower plane portions extending from eaves to eaves and connected by substantially vertical portions, a load supporting bracket having a portion fitting against one of said substantially vertical portions and welded thereto, and a flange extending laterally from said welded portion beneath said upper plane portion and below the plane of said lower plane portion.

5. In a car roof comprising upper and lower plane portions extending from eaves to eaves and connected by substantially vertical portions, a load supporting bracket comprising a flange fashioned to fit against one of said substantially vertical portions with a flange at its upper end extending beneath the upper plane portion of the roof, the said portions being welded to the roof and a bracket portion depending below said lower plane roof portion and having a flange extending laterally beneath said upper plane portion.

6. In a car roof comprising upper and lower plane portions extending from eaves to eaves and connected by substantially vertical portions, a load supporting anchorage comprising a series of brackets, each having a portion for fitting against one of said substantially vertical roof portions and welded thereto, said bracket portion depending below the lower plane roof portion and provided with a lateral flange extending beneath the upper plane roof portion, the brackets of said series being aligned with each other so that their lateral flanges are in the same horizontal plane.

WILLIAM D. THOMPSON.
DAVID W. HAWKSWORTH.